US011865068B2

(12) United States Patent
Liu et al.

(10) Patent No.: US 11,865,068 B2
(45) Date of Patent: Jan. 9, 2024

(54) NEGATIVE PRESSURE MASSAGE DEVICE AND MASSAGE STICK THEREOF

(71) Applicants: BIBOTING INTERNATIONAL CO., LTD., Taoyuan (TW); Po-Chang Liu, Taoyuan (TW)

(72) Inventors: Po-Chang Liu, Taoyuan (TW); Li-Pin Yuan, Taoyuan (TW)

(73) Assignees: BIBOTING INT'L. CO., LTD., Taoyuan (TW); Po-Chang Liu, Taoyuan (TW)

( * ) Notice: Subject to any disclaimer, the term of this patent is extended or adjusted under 35 U.S.C. 154(b) by 608 days.

(21) Appl. No.: 16/944,200

(22) Filed: Jul. 31, 2020

(65) Prior Publication Data

US 2022/0031556 A1 Feb. 3, 2022

(51) Int. Cl.
*A61H 9/00* (2006.01)
*A61H 23/02* (2006.01)

(52) U.S. Cl.
CPC ....... *A61H 9/0057* (2013.01); *A61H 23/0263* (2013.01); *A61H 2201/0111* (2013.01);
(Continued)

(58) Field of Classification Search
CPC .......... A61H 7/00; A61H 9/00; A61H 9/0057; A61H 23/00; A61H 23/02; A61H 27/00; A61H 2201/0111; A61M 1/00
See application file for complete search history.

(56) References Cited

U.S. PATENT DOCUMENTS

2006/0100555 A1 5/2006 Cagle et al.
2008/0195000 A1 * 8/2008 Spooner ............. A61H 23/0245 601/2

(Continued)

FOREIGN PATENT DOCUMENTS

CN 106176159 A 12/2016
CN 106512115 A * 3/2017 ............... A61H 7/00
(Continued)

OTHER PUBLICATIONS

An, CN106512115A Cupping device with electric heating function, pyroelectric probe and traditional Chinese medicine therapy instrument, Downloaded from Espacenet on Dec. 6, 2022 to add Page and Line Numbering. (Year: 2022).*
(Continued)

*Primary Examiner* — Valerie L Woodward
(74) *Attorney, Agent, or Firm* — BACON & THOMAS, PLLC

(57) ABSTRACT

A negative pressure massage device which includes a massage stick, an external negative pressure device and a communication pipe. The massage stick includes a stick body, an air channel in the stick body, a negative pressure connection hole and an air suction opening formed at both ends of the stick body and communicated with the air channel. The external negative pressure device is installed separately from the massage stick and includes a housing and a negative pressure drive/control module. The negative pressure drive/control module includes a controller, a negative pressure generating component, a pressure relief assembly and an air pipe assembly with a negative pressure communication hole formed on the housing. The ends of the communication pipe are communicated with the negative pressure connection hole and the negative pressure communication hole. This disclosure provides various negative pressure massage effects and improves the ease of operation.

15 Claims, 7 Drawing Sheets

(52) U.S. Cl.
CPC ................. *A61H 2201/0115* (2013.01); *A61H 2201/0153* (2013.01); *A61H 2201/0207* (2013.01); *A61H 2201/0214* (2013.01); *A61H 2201/0221* (2013.01); *A61H 2201/105* (2013.01); *A61H 2201/5025* (2013.01); *A61H 2201/5043* (2013.01)

(56) References Cited

U.S. PATENT DOCUMENTS

| | | | | |
|---|---|---|---|---|
| 2010/0036298 | A1 | 2/2010 | Fuster | |
| 2015/0283022 | A1* | 10/2015 | Lee .......................... | A61H 7/00 601/2 |
| 2016/0074641 | A1* | 3/2016 | Mehta .................... | A61H 23/02 604/315 |
| 2017/0036002 | A1 | 2/2017 | Ignon et al. | |
| 2022/0218561 | A1* | 7/2022 | Liu ...................... | A61H 9/0057 |

FOREIGN PATENT DOCUMENTS

| | | | | | |
|---|---|---|---|---|---|
| CN | 106860928 | A | * | 6/2017 | ........... A61H 9/0057 |
| CN | 108309716 | A | * | 7/2018 | ............. A61H 23/02 |
| CN | 209187160 | U | | 8/2019 | |
| CN | 210301858 | U | * | 4/2020 | ............. A61H 23/02 |
| CN | 210903240 | U | | 7/2020 | |
| JP | H09503847 | A | | 4/1997 | |
| JP | 2018527052 | A | | 9/2018 | |
| KR | 200325576 | Y1 | | 9/2003 | |
| KR | 20140094361 | A | | 7/2014 | |
| KR | 101675682 | B1 | | 11/2016 | |
| TW | M333186 | U | | 6/2008 | |
| TW | M377220 | U | | 4/2010 | |
| TW | M456811 | U | | 7/2013 | |
| WO | 2004066899 | A2 | | 8/2004 | |

OTHER PUBLICATIONS

Hu, CN108309716A Negative Pressure Massage Device and Negative Pressure Massage Method, Downloaded from PE2E Search on Dec. 6, 2022 to add Page and Line Numbering. (Year: 2022).*
Wang, CN106860928A Photon Suction Cup, Downloaded from Google Patents on Dec. 8, 2022 to add Page and Line Numbering. ( Year: 2022).*
Jiang, CN210301858U Skin massager, Downloaded from Espacenet on Dec. 10, 2022 to add Page and Line Numbering. (Year: 2022).*
Definition of Louver, Merriam-Webster, downloaded on Dec. 8, 2022. (Year: 2022).*
Office Action dated Mar. 4, 2022 of the corresponding Korean patent application No. 10-2020-0095279.
Office Action dated May 7, 2022 of the corresponding China patent application No. 202010756031.5.
German Office Action dated Jun. 14, 2021 of the corresponding German patent application No. 102020123081.8.
Japanese Office Action dated Jun. 29, 2021 of the corresponding Japan patent application No. 2020-133026.
Office Action dated Dec. 1, 2020 of the corresponding Philippian patent application No. 1/2020/050262.
Office Action dated Oct. 13, 2021 of the corresponding Canadian patent application No. 3,089,147.
Office Action dated Dec. 25, 2020 of corresponding Taiwan patent application No. 109118373.
Office Action dated Nov. 21, 2022 of the corresponding China patent application No. 202010756031.5.

* cited by examiner

6

NEGATIVE PRESSURE MASSAGE DEVICE AND MASSAGE STICK THEREOF

BACKGROUND OF THE INVENTION

1. Technical Field

The technical field of this disclosure relates to the technology of massage devices, and more particularly to a negative pressure massage device and its massage stick.

2. Description of Related Art

As the development of the industrial and commercial society advances, people nowadays are subject to different types of pressures in their living style that promotes speed and efficiency. Coupled with the factors of an abnormal diet, excessive food intake, and little exercise, many diseases related to cardiovascular problems or other unknown sources have arisen. To effectively achieve various functions of relaxing and improving our bodies, related manufacturers have continuously developed different massage apparatuses to meet the market requirements. Among these massage apparatuses, a massage stick with the features of low price, easy use, and convenient carrying and operation are widely favored by consumers in the market.

The structure of a conventional massage stick mainly includes a stick body and a vibrator installed inside the stick body, which is provided for driving the stick body to produce a corresponding vibrating effect. When the stick body is in contact with the shoulders, necks, or other parts of a user's body, it can achieve the effects of massaging and relieving pressure on different parts of the user's body.

Although the conventional massage stick structure has both vibrating and massaging effects, the user's skin and internal tissues of the skin cannot be fully exercised in actual use, much less achieving the effect of improving skin activation and blood circulation. In addition, after a force is applied to the stick body, blood stasis may result in the user's skin and tissues in the skin. Therefore, the conventional massage stick can no longer meet the existing market requirements for massage sticks and massage devices.

In view of the aforementioned drawbacks of the prior art, the discloser of the present disclosure, based on years of experience in the related industry in conducting extensive research and experiment, has finally provided a feasible solution to overcome the drawbacks of the prior art.

SUMMARY OF THE INVENTION

Therefore, it is a primary object of this disclosure to provide a negative pressure massage device and its massage stick that can produce various different negative pressure massage effects and improve the ease of operation.

To achieve the aforementioned and other objectives, the present disclosure discloses a negative pressure massage device comprising a massage stick, an external negative pressure device and a communication pipe. The massage stick comprises a stick body with an air channel formed in the stick body, and both ends of the stick body have a negative pressure connection hole and an air suction opening communicated with the air channel. The external negative pressure device is installed separately with the massage stick, and the external negative pressure device comprises a housing and a negative pressure drive/control module installed in the housing. The negative pressure drive/control module comprises a controller, a negative pressure generating component, a pressure relief assembly and an air pipe assembly, the negative pressure generating component and the pressure relief assembly are electrically coupled to the controller, the air pipe assembly is communicated with the negative pressure generating component and the pressure relief assembly, the air pipe assembly has a negative pressure communication hole formed on the housing, and both ends of the communication pipe are communicated with the negative pressure connection hole and the negative pressure communication hole respectively, wherein the negative pressure drive/control module can be operated to produce an alternating suction and relief massage effect for a negative pressure massage and negative pressure relief at the air suction opening of the massage stick.

To achieve the aforementioned and other objectives, the present disclosure also discloses a negative pressure massage stick coupled to an external negative pressure device, the negative pressure massage stick comprises a stick body with an air channel formed in the stick body, and both ends of the stick body respectively have a negative pressure connection hole and an air suction opening communicated with the air channel.

This disclosure has the following advantageous effects: The massage stick and the external negative pressure device are installed separately, so that the volume and weight of the massage stick can be reduced significantly to improve the ease of operation. With the installation of the waterproof rubber strip module, the exterior of the stick body can be rinsed and cleaned by water after use. In the application with a heating assembly, a medicated pad assembly, and a vibrator, the massage device also provides the effects of moxibustion heating and a somatosensory vibration.

DESCRIPTION OF THE PREFERRED EMBODIMENTS

Figure 1:
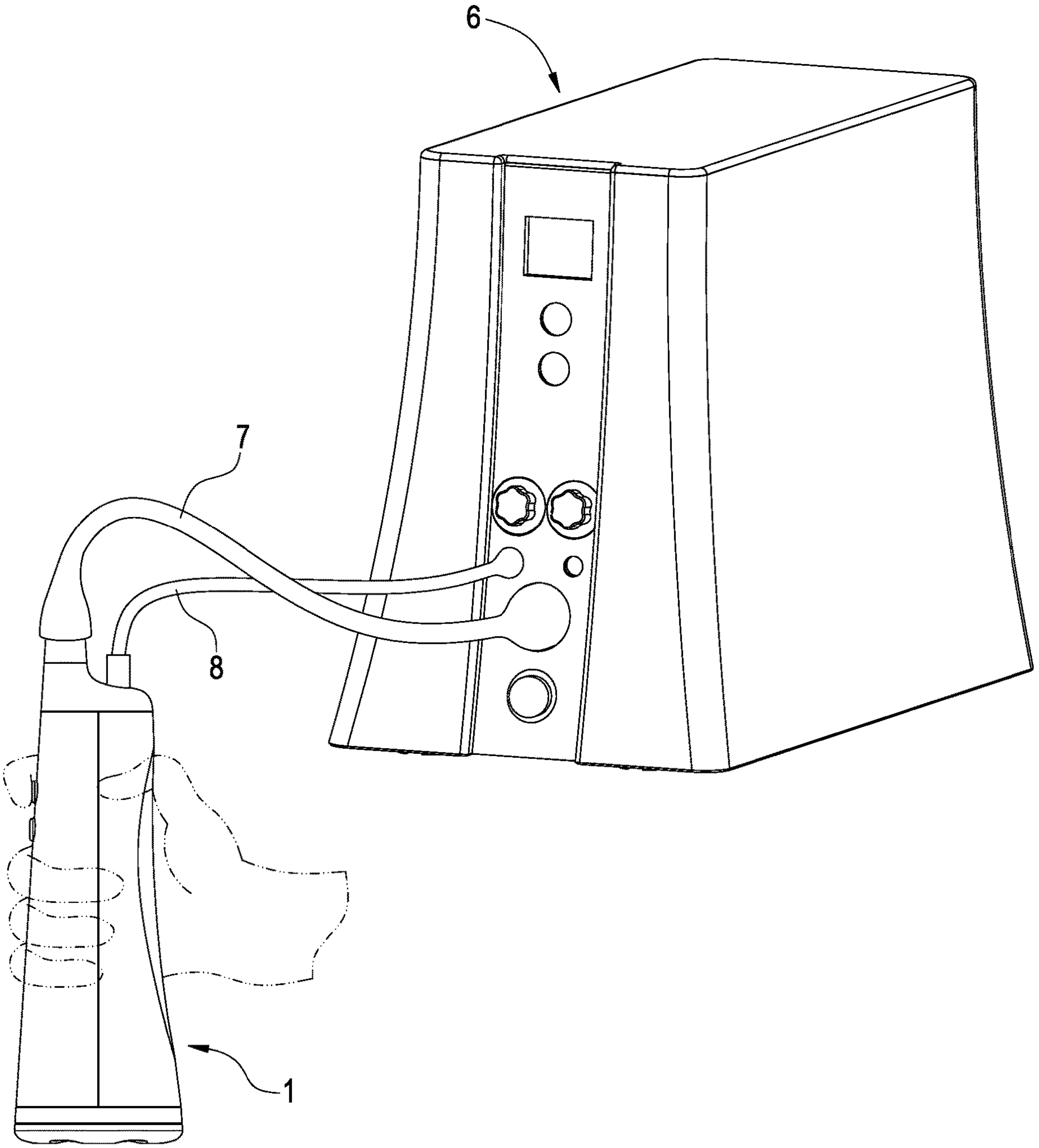
FIG. 1 is a perspective view of a negative pressure massage device of this disclosure.
Figure 2:
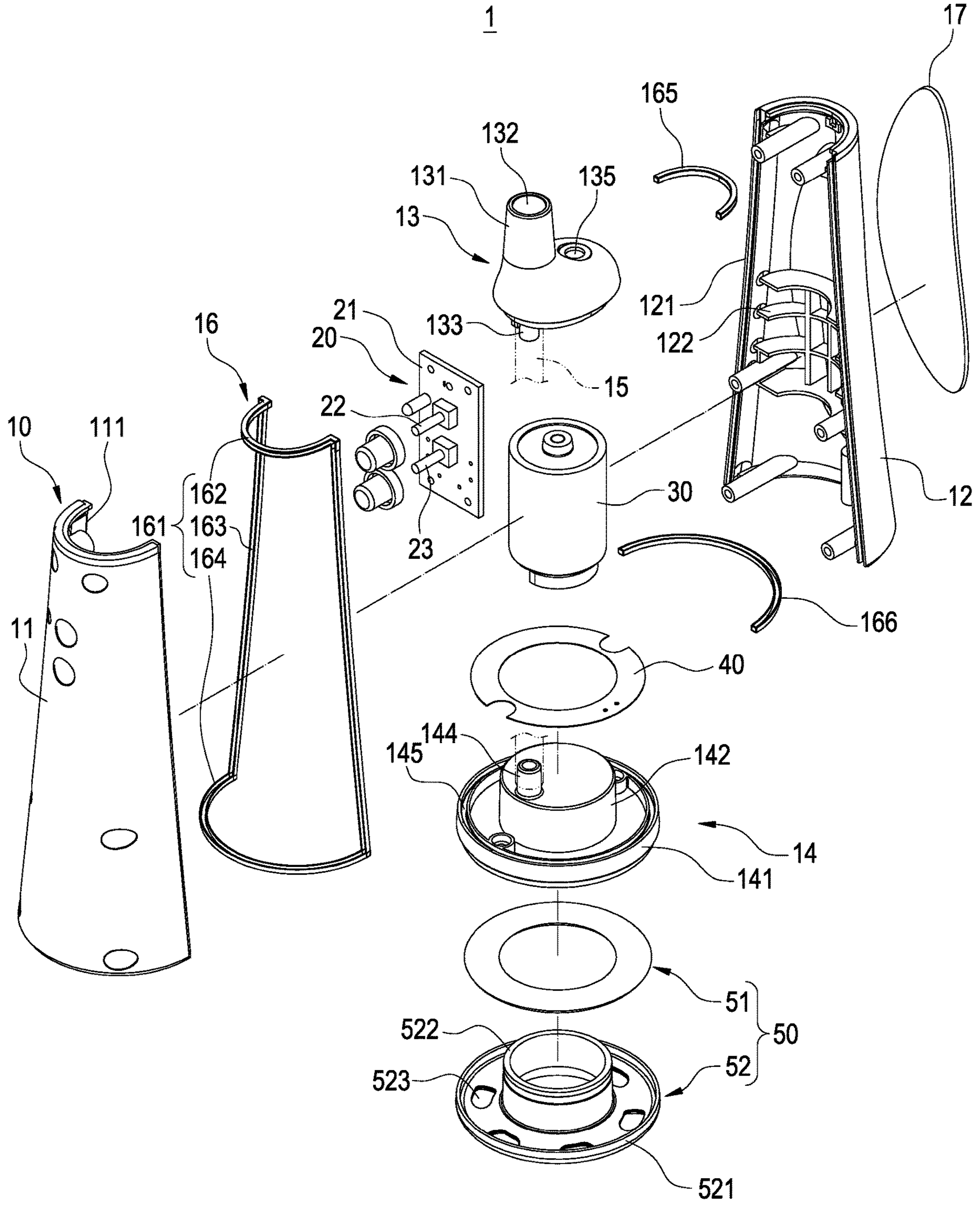
FIG. 2 is an exploded view of a massage stick of this disclosure.
Figure 3:
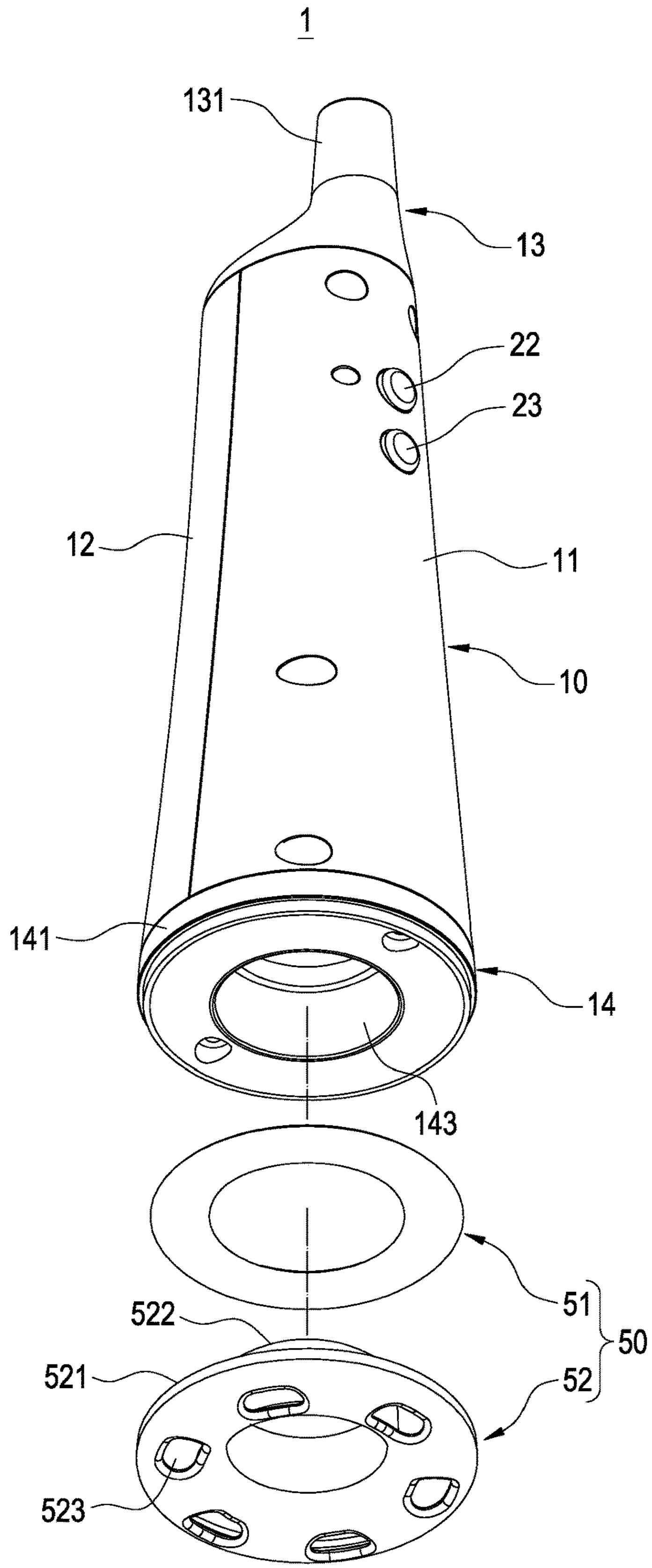
FIG. 3 is an exploded view of a stick body and a medicated pack assembly of this disclosure.
Figure 4:
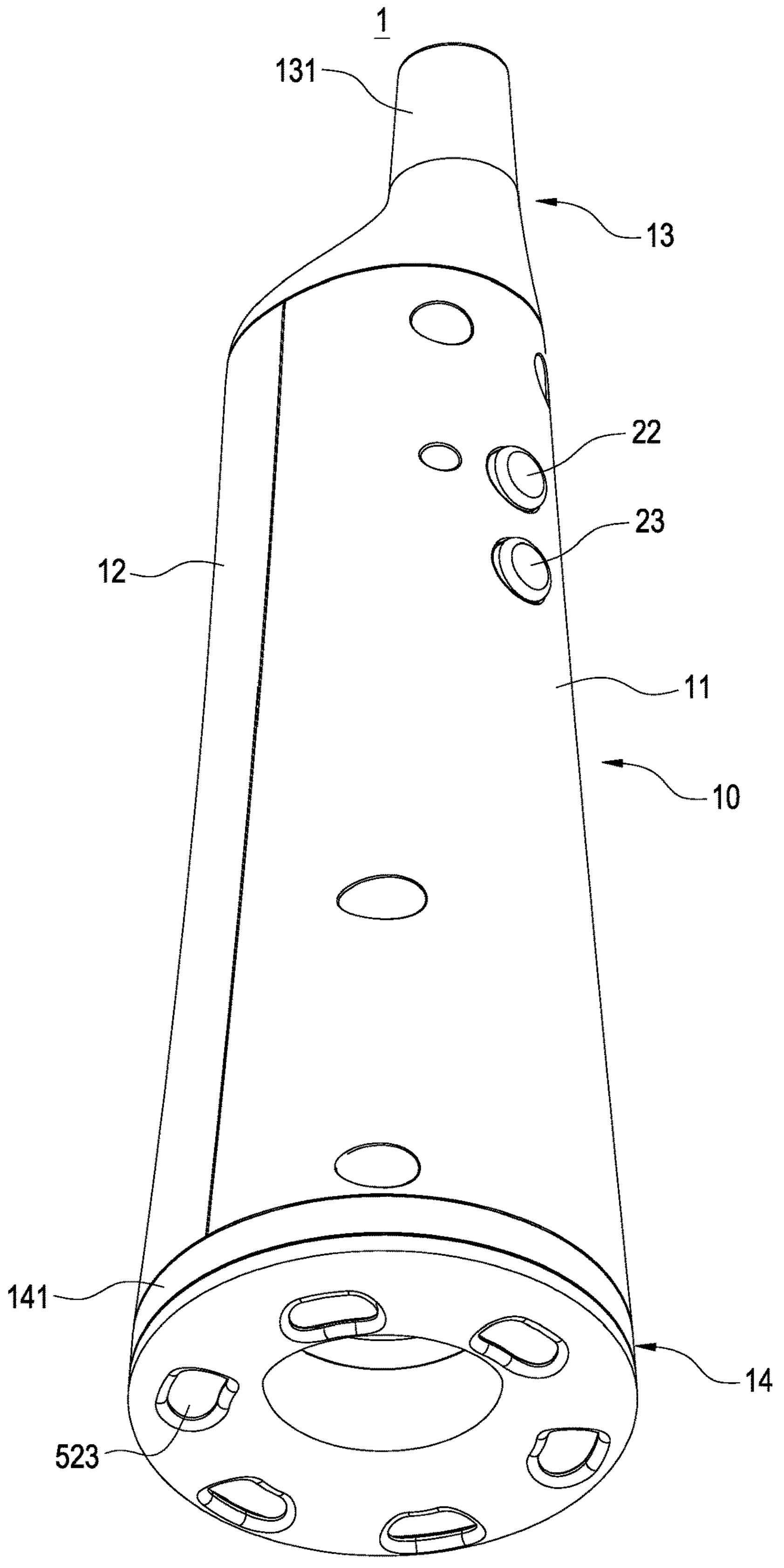
FIG. 4 is a perspective view of a massage stick of this disclosure.
Figure 5:
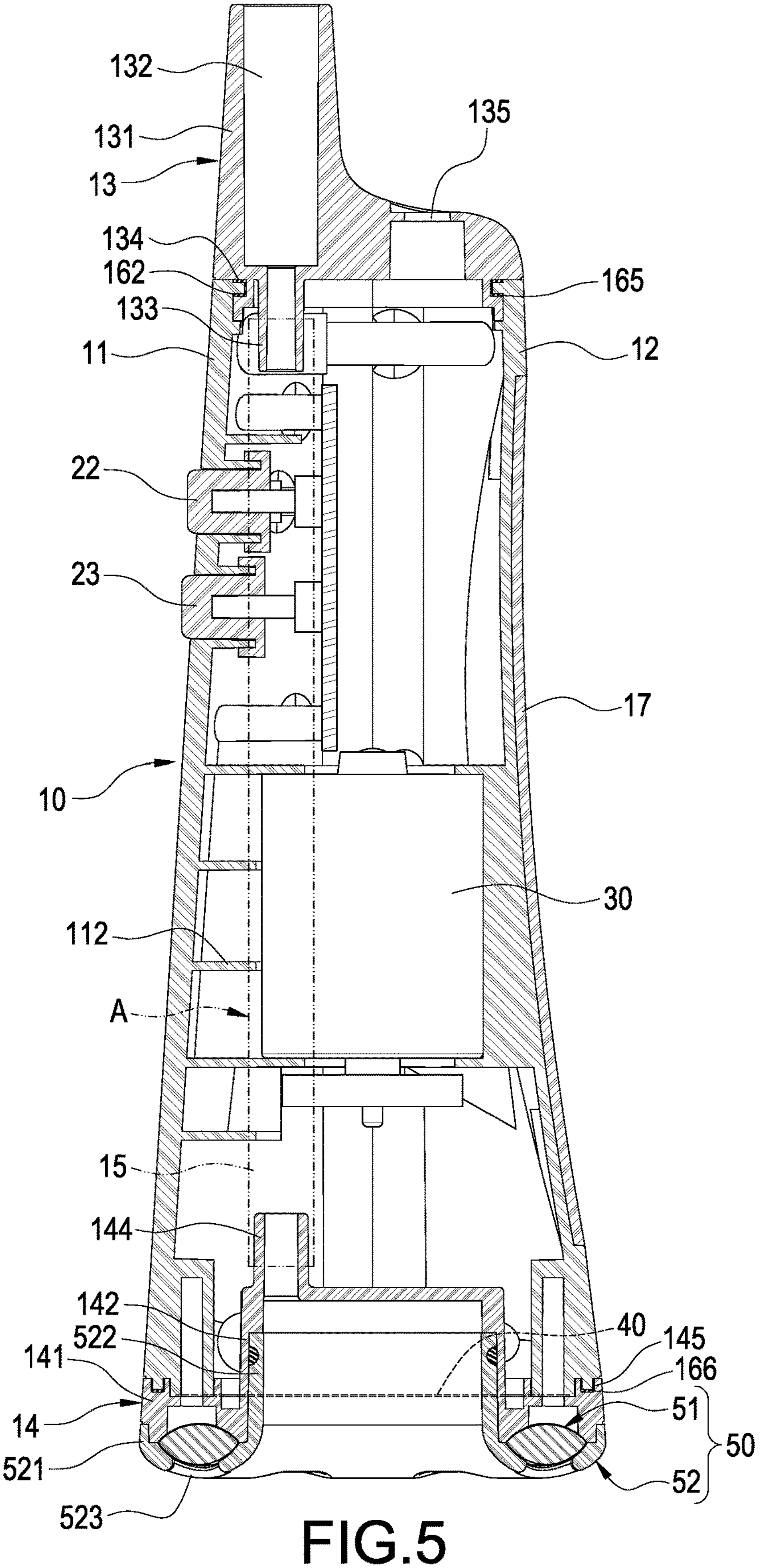
FIG. 5 is a cross-sectional view of a massage stick of this disclosure.

The technical contents of this disclosure will become apparent with the detailed description of preferred embodiments accompanied with the illustration of related drawings as follows. It is intended that the embodiments and drawings disclosed herein are to be considered illustrative rather than restrictive.

With reference to FIGS. 1 to 7 for a negative pressure massage device of this disclosure, the negative pressure massage device comprises a massage stick 1, an external negative pressure device 6 and a communication pipe 7, wherein the massage stick 1 and the external negative pressure device 6 are installed separately (in other words, they are independent devices), so that the communication pipe 7 can be used to connect the massage stick 1 and the external negative pressure device 6.

In FIGS. 2 to 5, the massage stick 1 comprises a stick body 10 in a substantially conical shape, and the stick body 10 of this embodiment comprises a front cover 11, a rear cover 12, an upper cover 13 and a lower cover 14. The front cover 11 and the rear cover 12 are engaged with each other and secured by a locking element such as a screw, the upper cover 13 is engaged with the upper ends of the front cover 11 and the rear cover 12 respectively, and the lower cover 14 is engaged with the lower ends of the front cover 11 and the rear cover 12.

The upper cover 13 has an extension tube 131 formed on a side of the upper cover 13, the extension tube 131 has a negative pressure connection hole 132 formed at the center of the extension tube 131 and a first connection tube 133 extending from the position precisely under the extension tube 131, and the negative pressure connection hole 132 is communicated with the first connection tube 133. The lower cover 14 comprises a round disc 141 and a boss 142 extending from the interior of the round disc 141, and the boss 142 has an air suction opening 143 formed at the center of the boss 142, a second connection tube 144 extends from a side of the boss 142, the second connection tube 144 is communicated with the air suction opening 143, and a connection tube 15 is communicated with the first connection tube 133 and second connection tube 144, so as to form an air channel A in the stick body 10.

In this embodiment, the stick body 10 further comprises a waterproof rubber strip module 16, the waterproof rubber strip module 16 comprises a first waterproof strip 161, a second waterproof strip 165 and a third waterproof strip 166, wherein the first waterproof strip 161 comprises an upper arc section 162 coupled to a side strip section 163 at both ends of the upper arc section 162 and coupled to a lower arc section 164 of each side strip section 163, and the second waterproof strip 165 and the third waterproof strip 166 are in a substantially semicircular arc shape. The inner peripheries of the front cover 11 and the rear cover 12 have a front embedded groove 111 and a rear embedded groove 121 respectively, the peripheries of the upper cover 13 and the lower cover 14 also have a first embedded groove 134 and a second embedded groove 145 respectively, each side strip section 163 is embedded into the front embedded groove 111 and the rear embedded groove 121, the upper arc section 162 and the second waterproof strip 165 are engaged and jointly embedded into the first embedded groove 134, and the lower arc section 164 and the third waterproof strip 166 are engaged and jointly embedded into the second embedded groove 145, so that the interior of the stick body 10 has the waterproof and moisture-proof effects.

In this embodiment, the stick body 10 further comprises an anti-slip pad 17 adhered to an external surface of the rear cover 12 to provide the anti-slip and anti-separation functions when a user holds the stick body 10 with their hands.

In this embodiment, the massage stick 1 further comprises a control assembly 20 and a vibrator 30 electrically coupled to the control assembly 20, the middle sections of the inner sides of the front cover 11 and the rear cover 12 have a front carrying rack 112 and a rear carrying rack 122 respectively. The vibrator 30 of this embodiment comprises a motor and an eccentric component coupled to a shaft of the motor, the eccentric component can be an eccentric wheel or an eccentric block for producing vibrations, the eccentric component is fixed between the front carrying rack 112 and the rear carrying rack 122, the control assembly 20 is installed above the vibrator 30 and comprises a circuit board 21 and a first switching button 22 installed on the circuit board 21, and a partial area of the first switching button 22 is exposed from the front cover 11 and the first switching button 22 is provided to control the ON/OFF of the vibrator 30.

In this embodiment, the massage stick 1 further comprises a heating assembly 40 installed in the lower cover 14, the lower cover 14 is made of a metal material with good thermal conductivity, the heating assembly 40 of this embodiment is an electric heating plate electrically coupled to the circuit board 21, the control assembly 20 further comprises a second switching button 23 installed on the circuit board 21, and a partial area of the second switching button 23 is also exposed from the front cover 11 and the second switching button 23 is provided to control the ON/OFF of the heating assembly 40. The lower cover 14 can be heated up to provide the massage and heating effects.

In this embodiment, the massage stick 1 further comprises a medicated pad assembly 50 used together with the heating assembly 40, the medicated pad assembly 50 is installed correspondingly at the bottom of the lower cover 14 and comprises a medicine pack 51 and a retaining assembly 52, wherein medicine pack 51 is formed by a packaging bag containing Chinese medicines and herbs (such as wormwood), the retaining assembly 52 has a tray 521 for placing the medicine pack 51 and a hollow column 522 extending upwardly from the tray 521, wherein the hollow column 522 is correspondingly passed through the air suction opening 143 and communicated with the air suction opening 143, and the tray 521 has a plurality of ventilation holes 523 for dissipating the heat of the medicine pack 51 after the medicine pack 51 is heated.

Figure 6:
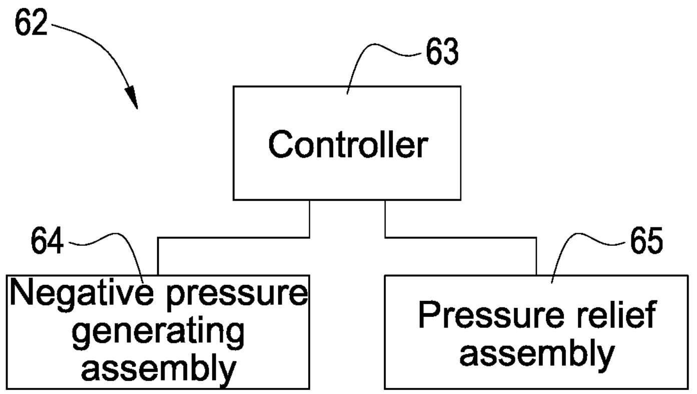
FIG. 6 is a block diagram of a negative pressure drive/control module of this disclosure.
Figure 7:
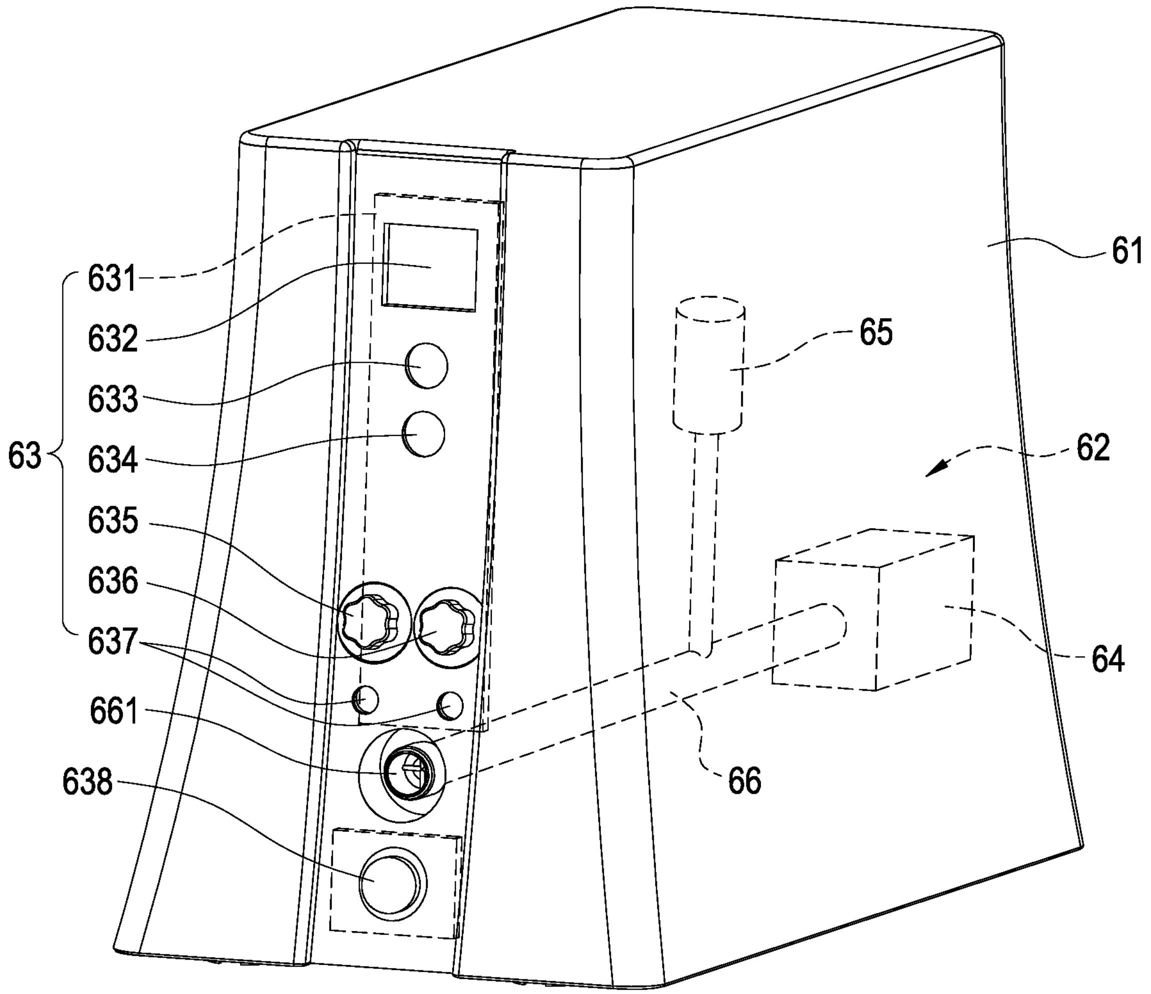
FIG. 7 is a perspective view of an external negative pressure device of this disclosure.

In FIGS. 6 and 7, the external negative pressure device 6 comprises a housing 61 and a negative pressure drive/control module 62 installed in the housing 61, the negative pressure drive/control module 62 comprises a controller 63, a negative pressure generating component 64, a pressure relief assembly 65 and an air pipe assembly 66, and the controller 63 comprises a circuit board 631, and the circuit board 631 comprises a display panel 632, a continuous suction button 633, an intermittent suction button 634, a negative pressure seconds control button 635, a pressure relief seconds control button 636 and two second ports 637 thereon, wherein the second port 637 of this embodiment is a DC jack electrically coupled to the controller 63 through a power button 638. The negative pressure generating component 64 and the pressure relief assembly 65 are electrically coupled to the controller 63, the air pipe assembly 66 is communicated with the negative pressure generating component 64 and the pressure relief assembly 65, and the air pipe assembly 66 has a negative pressure communication hole 661 formed on the housing 61. Wherein, the negative pressure generating component 64 comprises a vacuum pump and a motor (not shown in the figures) for generating a negative pressure, and the air suction opening 143 of the massage stick 1 produces a suction to the user's skin. In general applications, the maximum negative pressure is limited to −46.7 kPa (or −350 mmHg).

In FIG. 1, the ends of the communication pipe 7 are communicated with the negative pressure connection hole 132 and the negative, pressure communication hole 661 respectively, and the negative pressure drive/control module 62 can be operated to produce an alternating suction and relief massage effect for a negative pressure massage and a negative pressure relief at the air suction opening 143 of the massage stick 1.

The negative pressure massage device of this disclosure further comprises a conductive wire 8 electrically coupled to the massage stick 1 and the external negative pressure device 6, and a first port 135 is formed on a side of the extension tube 131 of the upper cover 13 and electrically coupled to the control assembly 20. In this embodiment, the first port 135 is a conductive jack. Specifically, both ends of the conductive wire 8 are coupled to the first port 135 and the second port 637 respectively.

During use, the negative pressure massage device can perform an alternating suction and relief massage effect for a negative pressure massage and negative pressure relief for the users' shoulders, necks, or other parts of the body. After the lower cover 14 or the retaining assembly 52 is in contact with the users' skin, a vacuum pump of the negative pressure generating component 64 can be operated to produce a negative pressure at the air suction opening 143, so that the users' skin is sucked and gradually swollen. When the negative pressure is released, the skin will stop being sucked and swollen. When the pressure relief assembly 65 is operated to direct air from the air pipe assembly 66 into the air channel A, the negative pressure is released or reduced, so that the skin gradually returns to its original state, and the aforementioned operation is repeated. During this time period, the users may turn on or off the vibrator 30 at any time to vibrate the stick body 10 to promote blood circulation, so that the skin and its tissues can be fully exercised to achieve the effects of activating the skin, improving the blood circulation, increasing the effect of various treatments, and lowering the incidence of blood stasis.

Figure 8:
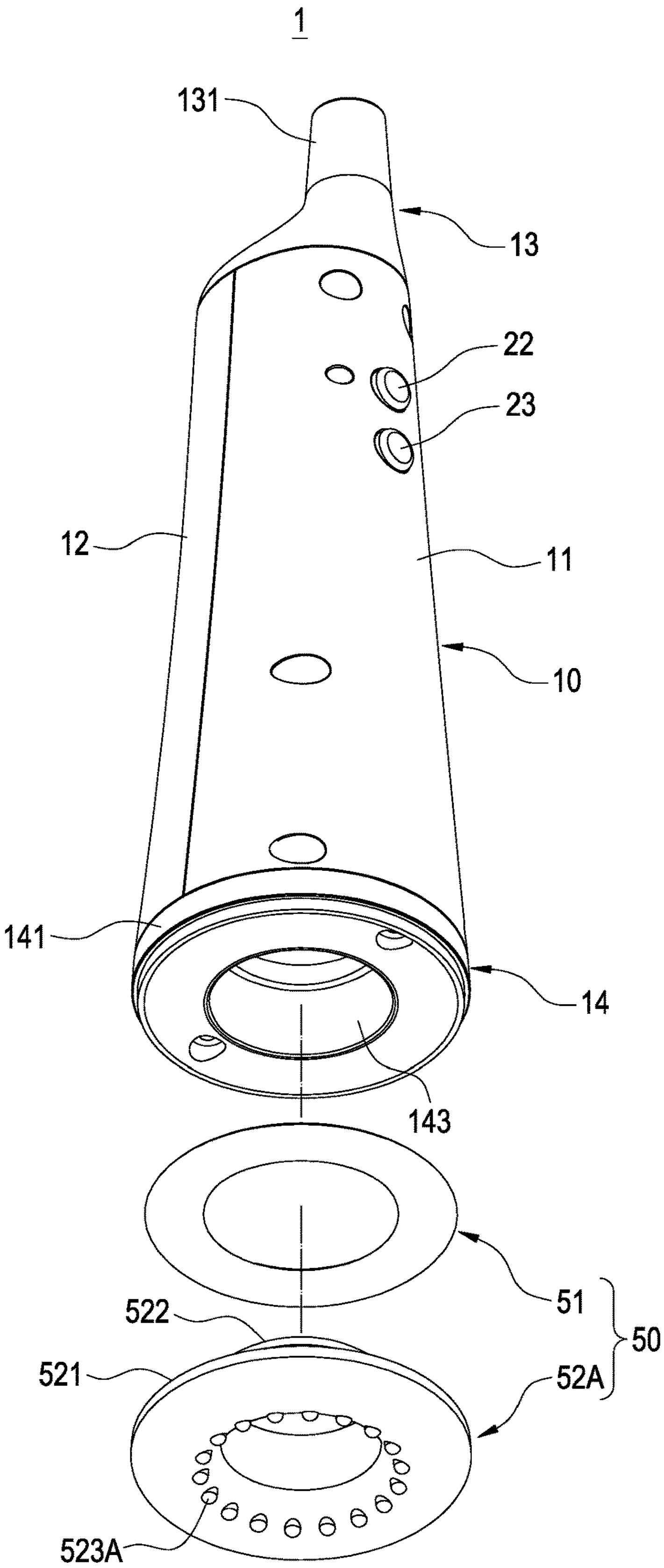
FIG. 8 is an exploded view of a stick body and a medical pack assembly in accordance with another embodiment of this disclosure.

In FIG. 8, the medicated pad assembly can be designed as is in the aforementioned embodiment, but each ventilation hole 523A of the retaining assembly 52A of this embodiment can be formed at the junction of the tray 521 and the hollow column 522, so that these components are arranged in a substantially circular shape.

In addition to the function for connecting the massage stick 1, the external negative pressure device 6 of this disclosure can be used by other related devices (such as breast enhancers, can openers, etc.) to achieve a multi-purpose function and reduce the user's purchase and application cost.

In summary, the negative pressure massage device and its massage stick in accordance with this disclosure can surely achieve the expected effects and overcome the drawbacks of the prior art, and also complies with the patent application requirements. Thus, this disclosure is duly filed for patent application.

While this disclosure has been described by means of specific embodiments, numerous modifications and variations could be made thereto by those skilled in the art without departing from the scope and spirit of this disclosure set forth in the claims.

What is claimed is:

1. A negative pressure massage device, comprising:

a negative pressure massage stick, comprising a stick body, a control assembly and a vibrator, the stick body with an air channel formed therein, wherein the stick body has a negative pressure connection hole at one end and an air suction opening at an opposite end communicated with the air channel, the control assembly and the vibrator are installed at the stick body and the vibrator is electrically coupled to the control assembly;

an external negative pressure device, installed separately with the negative pressure massage stick, comprising a housing and a negative pressure drive/control module installed in the housing, the negative pressure drive/control module comprising a controller, a negative pressure generating component, a pressure relief assembly and an air pipe assembly, the negative pressure generating component and the pressure relief assembly being electrically coupled to the controller, the air pipe assembly being communicated with the negative pressure generating component and the pressure relief assembly, and the air pipe assembly having a negative pressure communication hole formed on the housing;

a communication pipe, having one end communicated with the negative pressure connection hole and an opposite end communicated with the negative pressure communication hole; and a conductive wire, the negative pressure massage stick having a first port, the external negative pressure device having a second port, and both one end of the conductive wire being electrically coupled to the first port and another end of the conductive wire being electrically coupled to the second port, and the control assembly is electrically coupled to the first port;

wherein the negative pressure drive/control module is operated to produce an alternating suction and relief massage effect for a negative pressure massage and a negative pressure relief at the air suction opening of the negative pressure massage stick;

wherein the negative pressure massage stick further comprises a heating assembly and a medicated pad assembly, the stick body comprises a lower cover, the heating assembly is installed in the lower cover and electrically coupled to the control assembly, and the medicated pad assembly is installed at a bottom of the lower cover;

wherein the medicated pad assembly comprises a medicine pack and a retaining assembly, the retaining assembly has a tray for placing the medicine pack and a hollow column extending from the tray for passing through the air suction opening and communicating with the air suction opening, and the tray has a plurality of ventilation holes for dissipating heat of the medicine pack after the medicine pack is heated;

wherein a shape of the heating assembly is matched with a shape of the medicine pack, and the heating assembly and the medicine pack are substantially in an annular shape;

wherein the medicine pack is disposed on the ventilation holes;

wherein the ventilation holes are located at a bottommost surface of the negative pressure massage stick.

2. The negative pressure massage device as claimed in claim 1, wherein the stick body comprises a front cover, and a rear cover engages correspondingly with the front cover, inner sides of the front cover and the rear cover have a front carrying rack and a rear carrying rack respectively, and the vibrator is fixed between the front carrying rack and the rear carrying rack.

3. The negative pressure massage device as claimed in claim 1, wherein the controller comprises a circuit board, a display panel installed on the circuit board, a continuous suction button, an intermittent suction button, a negative pressure seconds control button, a pressure relief seconds control button and two second ports, which are electrically coupled to the controller through a power button.

4. The negative pressure massage device as claimed in claim 1, wherein the stick body comprises a front cover, a rear cover, an upper cover, and the lower cover, the front cover is engaged correspondingly with the rear cover, the upper cover is engaged with upper ends of the front cover and the rear cover respectively, and the lower cover is engaged with lower ends of the front cover and the rear cover respectively.

5. The negative pressure massage device as claimed in claim 4, wherein the upper cover has an extension tube formed on a top side of the upper cover, the negative pressure connection hole is formed at the extension tube, the lower cover comprises a round disc and a boss extending from the round disc, and the air suction opening is formed inside the boss.

6. The negative pressure massage device as claimed in claim 5, wherein the extension tube has a first connection tube extending from underneath the extension tube, the boss has a second connection tube coupled with the boss, the second connection tube and the air suction opening are communicated with each other, and a connection tube is provided and communicated with the first connection tube and the second connection tube to form the air channel.

7. The negative pressure massage device as claimed in claim 4, wherein the stick body further comprises a waterproof rubber strip module, the waterproof rubber strip module comprises a first waterproof strip, a second waterproof strip and a third waterproof strip, the first waterproof strip comprises an upper arc section coupled to a side strip section on both ends of the upper arc section and a lower arc section coupled on both sides to opposite ends of the side strip section at both ends of the upper arc section, the front cover and the rear cover have a front embedded groove and a rear embedded groove formed on inner sides thereof respectively, the upper cover and the lower cover have a first embedded groove and a second embedded groove formed at peripheries thereof respectively, and a side strip section on both ends of the upper arc section is embedded into the front embedded groove and the rear embedded groove, the upper arc section and the second waterproof strip are engaged and jointly embedded into the first embedded groove, and the lower arc section and the third waterproof strip are engaged and jointly embedded into the second embedded groove.

8. The negative pressure massage device as claimed in claim 4, wherein the stick body further comprises an anti-slip pad adhered to an external surface of the rear cover.

9. A negative pressure massage stick for coupling to an external negative pressure device, comprising: a stick body with an air channel formed therein, the stick body comprising a negative pressure connection hole formed at one end thereof and an air suction opening formed at another end thereof, and the negative pressure connection hole and the air suction opening communicating with the air channel;

wherein the negative pressure massage stick further comprises a control assembly and a vibrator, the control assembly and the vibrator are installed at the stick body and the vibrator is electrically coupled to the control assembly, the negative pressure massage stick has a first port, and the control assembly is electrically coupled to the first port;

wherein the negative pressure massage stick further comprises a heating assembly and a medicated pad assembly, the stick body comprises a lower cover, the heating assembly installed in the lower cover and electrically coupled to the control assembly, and the medicated pad assembly is installed at a bottom of the lower cover;

wherein the medicated pad assembly comprises a medicine pack and a retaining assembly, the retaining assembly has a tray for placing the medicine pack and a hollow column extending from the tray for passing through the air suction opening and communicating with the air suction opening, and the tray has a plurality of ventilation holes for dissipating heat of the medicine pack after the medicine pack is heated;

wherein a shape of the heating assembly is matched with a shape of the medicine pack, and the heating assembly and the medicine pack are substantially in an annular shape;

wherein the medicine pack is disposed on the ventilation holes;

wherein the ventilation holes are located at a bottommost surface of the negative pressure massage stick.

10. The negative pressure massage stick as claimed in claim 9, wherein the stick body comprises a front cover and a rear cover correspondingly engaged with the front cover, the front cover and the rear cover have a front carrying rack and a rear carrying rack disposed on inner sides thereof, and the vibrator is fixed between the front carrying rack and the rear carrying rack.

11. The negative pressure massage stick as claimed in claim 9, wherein the stick body comprises a front cover, a rear cover and an upper cover, the front cover is engaged correspondingly with the rear cover, the upper cover is engaged with upper ends of the front cover and the rear cover respectively, and the lower cover is engaged with lower ends of the front cover and the rear cover respectively.

12. The negative pressure massage stick as claimed in claim 11, wherein the upper cover has an extension tube formed on a top side of the upper cover, the negative pressure connection hole is formed at the extension tube, the lower cover comprises a round disc and a boss extending from the round disc, and the air suction opening is formed inside the boss.

13. The negative pressure massage stick as claimed in claim 12, wherein the extension tube has a first connection tube extending from underneath the extension tube, the boss has a second connection tube coupled with the boss, the second connection tube and the air suction opening are communicated with each other, and a connection tube is communicated with the first connection tube and the second connection tube to form the air channel.

14. The negative pressure massage stick as claimed in claim 11, wherein the stick body further comprises a waterproof rubber strip module, the waterproof rubber strip module comprises a first waterproof strip, a second waterproof strip and a third waterproof strip, the first waterproof strip comprises an upper arc section coupled to a side strip section at both ends of the upper arc section and a lower arc section coupled on both sides to opposite ends of the side strip section at both ends of the upper arc section, the front cover and the rear cover have a front embedded groove and a rear embedded groove formed on inner sides thereof respectively, the upper cover and the lower cover have a first embedded groove and a second embedded groove formed at peripheries thereof respectively, a side strip section on both ends of the upper arc section is embedded into the front embedded groove and the rear embedded groove, the upper arc section and the second waterproof strip are engaged and jointly embedded into the first embedded groove, and the lower arc section and the third waterproof strip are engaged and jointly embedded into the second embedded groove.

15. The negative pressure massage stick as claimed in claim 11, wherein the stick body further comprises an anti-slip pad, and the anti-slip pad is adhered to an external surface of the rear cover.

* * * * *